United States Patent [19]

Klein et al.

[11] 4,295,989

[45] Oct. 20, 1981

[54] LUMINESCENT HAFNIA COMPOSITION

[75] Inventors: Philipp H. Klein, Washington, D.C.; Arrigo Addamiano; Roger Allen, both of Alexandria, Va.

[73] Assignee: The United States of America as represented by the Secretary of the Navy, Washington, D.C.

[21] Appl. No.: 162,347

[22] Filed: Jun. 23, 1980

[51] Int. Cl.³ .................................................. C09K 11/463
[52] U.S. Cl. .................................................. 252/301.4 F
[58] Field of Search .................. 252/301.4 F; 313/468, 313/486

[56] References Cited

U.S. PATENT DOCUMENTS

| | | | |
|---|---|---|---|
| 3,640,887 | 2/1972 | Anderson | 252/301.4 F X |
| 3,715,611 | 2/1973 | Hijman et al. | 252/301.4 F X |
| 4,014,812 | 3/1977 | Kelsey et al. | 252/301.4 F |
| 4,088,599 | 5/1978 | Suzuki et al. | 252/301.4 F |

FOREIGN PATENT DOCUMENTS 2234968  1/1973  Fed. Rep. of Germany ... 252/301.4 F

OTHER PUBLICATIONS

Rao "Solid State Chemistry", Marcel Dekker Inc., N.Y., 1974, p. 33.

*Primary Examiner*—Jack Cooper
*Attorney, Agent, or Firm*—R. S. Sciascia; A. L. Branning; T. E. McDonnell

[57] ABSTRACT

A cubia, yttria stabilized halnia phosphor, doped with $Ce^{3+}$, has been discovered. The phosphor has a blue luminescence, peaking at about 4200 A, with a secondary peak in the 3800–4000 A region. The optimum composition is $3hfO_2:Y_2O_3:Ce^{3+}$ where the $Ce^{3+}$ dopant ranges from 0.1–1.0 weight %.

11 Claims, 2 Drawing Figures

LUMINESCENT HAFNIA COMPOSITION

BACKGROUND OF THE INVENTION

This invention relates to phosphors emmitting visible luminescence under ultra violet excitation, and more particularly, to a cubic, yttria-stabilized $HfO_2$ phosphor, doped with cerium.

The term phosphor is generally employed in the art to describe luminescent or fluorescent solids which are composed of two ingredients; a "host" matrix, and an "activator" impurity. Such phosphors find many diverse uses including laser applications, as fluorescent lamps, and color cathode ray tubes.

The properties of the cubic form of $HfO_2$ phosphors are unknown since the material normally exists in its monoclinic crystalline state. The only reference in the prior art to a "probable cubic form" of $HfO_2$ is that of *L. Passerini: Gazz, Chem. Ital.* 60, 762–766 (1930), who hypothesized that cubic $HfO_2$ should have a cell edge $a_0 = 5.155$ Å. This value, however, was extrapolated from measurements of cubic cell-edges of the crystal $HfO_2$—$CeO_2$, where samples ranging from 95 to 5% $CeO_2$ were measured. Pure $HfO_2$ has not been actually found to have a cubic (fluorite) structure; when fired up to 1300° C. it is, as we have verified, monoclinic.

SUMMARY OF THE INVENTION

In accordance with this invention a new phosphor compound has been discovered, consisting essentially of 99.0 to 99.9 weight percent of yttria and cubic hafnia in a $HfO_2:Y_2O_3$ mole ratio of about 3:1 and including from 0.1 to 1.0 weight percent of cerium dopant.

It is an object of this invention to produce a phosphor that is photoluminescent and cathode luminescent in the blue-green region of the optical spectrum.

It is a further object of this invention to provide a host matrix for trivalent cerium ($Ce^{3+}$) which will fluoresce in the blue-green region of the optical spectrum.

Other objects, advantages and novel features of the invention will become apparent from the following detailed description of the invention when considered in conjunction with the accompanying drawings wherein:

FIG. 1 discloses the luminescent emmision curve for the phosphor having a composition of $3HfO_2: 1Y_2O_3:0.4\%Ce^{3+}, 0.4\%Li^+$.

FIG. 2 discloses the emmission curve for the phosphor having a composition of $3HfO_21:Y_2O_3:0.4\%Ce^{3+}, 0.8\%Li^+$.

DETAILED DESCRIPTION OF THE INVENTION

Figure 1:
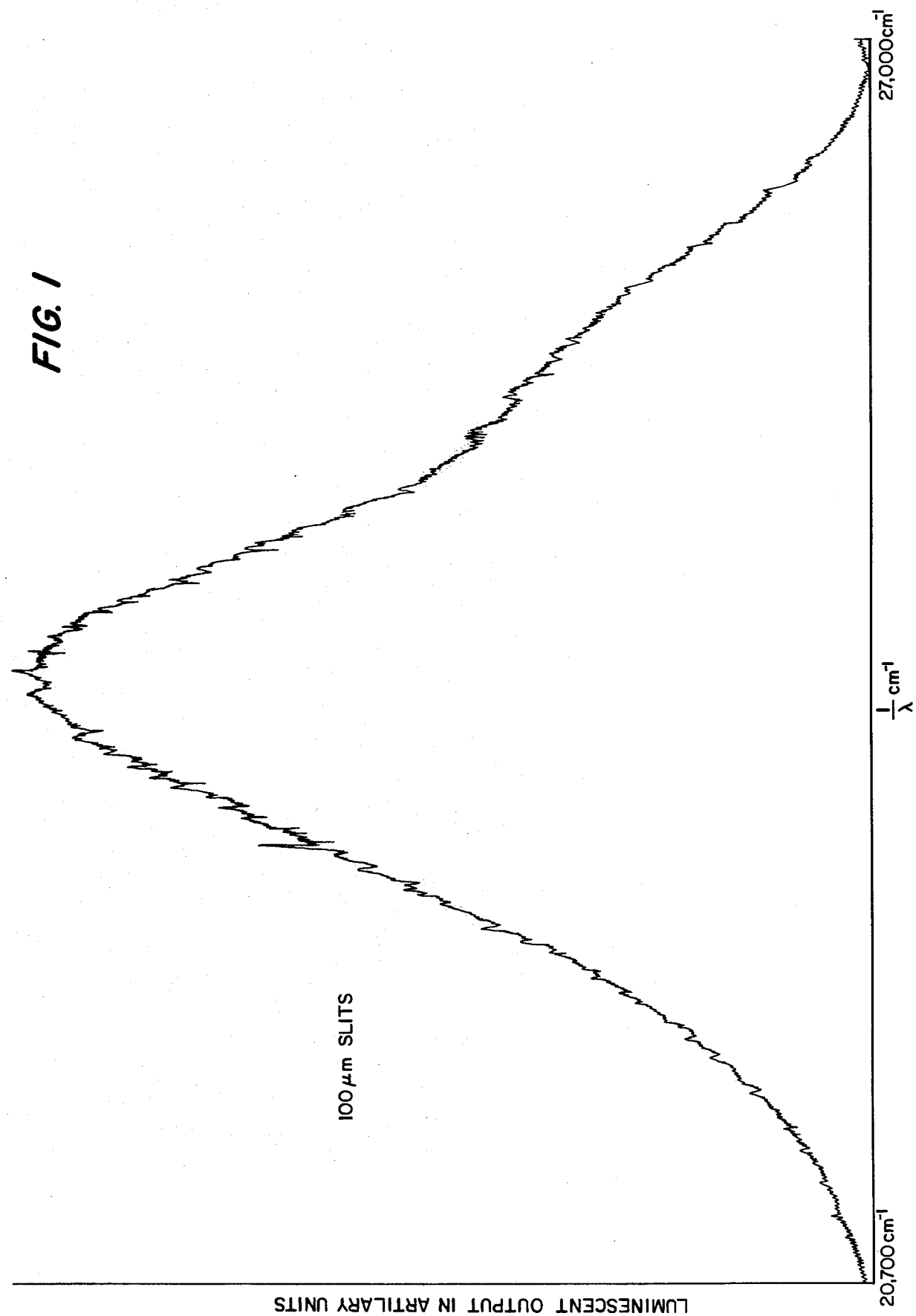

As is essential in phosphor chemistry, purity of the ingredients used is of fundamental importance. Until recently, it has been difficult to obtain $HfO_2$ of the necessary purity (99.999%) required. Currently, pure $HfO_2$ can be obtained from Ames Laboratory, Ames, Iowa. Alternatively, pure $HfO_2$ can be prepared by dissolving pure hafnium metal in hydrofluoric acid, then precipitating $Hf(OH)_4$ with ammonium hydroxide, filtering, rinsing first with dilute ammonia, then with $H_2O$, and finally baking the resultant white powder in a vacuum furnace. The $Y_2O_3$ used should be about 99.999% pure.

Pure cubic, yttria stabilized $HfO_2$ does not emit in the blue region of the spectrum, in the absence of dopants, under U.V. excitation. However, mixtures of $Y_2O_3$ and $HfO_2$ have been predicted by E. N. Isupova et al., Neorg. Mater. Vol. 5, No. 11, pp 1948–1952, Nov., 1969 as forming a cubic (fluorite) structure. It is critical that the mole ratio $Y_2O_3:HfO_2$ is not less than 1 to 3 in order to maintain this homogeneous cubic phase after firing up to 1300° C.; if more $HfO_2$ is introduced as a host into the system, other phases, particularly monoclinic, will enter into the crystalline structure.

The doping of the $HfO_2$—$Y_2O_3$ matrix by $Ce^{3+}$ ions is preferably carried out by preparing dilute aqueous solutions, e.g. 0.001 molar, of $Ce(NO_3)_3$, or, other suitable $Ce^{3+}$ salts, either as solutions or dry; however, the double nitrates of $Ce^{3+}$ and $Mg^{2+}$ have also proven satisfactory. After a measured amount of aqueous $Ce^{3+}$ ions have been added to the mixture, the resultant paste is preferably dried in air before high-temperature firing. An initial high temperature firing before $Ce^{3+}$ doping has been found not to affect the final properties of the phosphor. The addition of small amounts of mineralizers, such as up to 1 weight percent of $NaNO_3$, $LiNO_3$, $Mg(NO_3)_2$ or $LiCl$, for example, have proven useful in creating a more uniform material, but are not essential for luminescense in the blue portion of the spectrum. Preferably, the amount of mineralizers added, usually $NaNO_3$ or $LiCl$, is molecularly equivalent to $Ce^{3+}$ added. The mineralizer is added by using a measured amount of an aqueous solution, before the drying in air and subsequent high temperature firing.

Once the desired composition has been mixed together, a high temperature firing to about 1300° C. for a suitably long time period (2–100 hours) should commence. Preferably, the phosphor composition is fired after being placed in an extremely pure container of pyrolytic boron nitride (preferred), or, equivalently in quartz (vitreosil), alundum, graphite, and the like. Either an inert atmosphere, such as argon, or a slightly reducing one, such as 99%$N_2$, 1%$H_2$, is preferred for the 1300° C. firing, but other equivalent environments can be employed. As was stated previously, the firing at about 1300° C. can occur before the addition of $Ce^{3+}$ and the mineralizer.

After completion of this firing and subsequent cooling, a second firing at temperatures of the order of 1000° C. for a period of 1 to 10 hours in an oxidizing atmosphere, such as air, has been found to optimize luminescence. Air firing has been found particularly beneficial when a graphite boat is used for the first firing.

EXAMPLE I

To 2 g of composition $3HfO_2:1Y_2O_3$ in a pyrex beaker was added a sufficient dilute solution of $Ce(NO_3)_3$ and $LiCl$ to get after drying a powder of composition $3HfO_2:1Y_2O_3:0.4\%Ce^{3+}:0.4\%Li^+$. The mixture was allowed to dry on a hot plate. It was then transferred to a boat of pyrolytic boron nitride (PBN) and was fired up to 1300° C. in an argon atmosphere for 40 hours. During the firing the PBN boat was covered with a flat lid of boron nitride. After cooling to room temperature, the boat was transferred to a furnace kept at 1000° C. and was kept there an additional 16 hrs in air. The $3HfO_2:Y_2O_3:0.4\%Ce^{3+}:0.4\%Li^+$ obtained is a crystalline cubic powder of light blue color. When excited by 3650 Å irradiation it emits blue light, in the form of the broad spectrum shown in FIG. 1. The same spectrum is shown when the phosphor is excited by cathode rays.

EXAMPLE II

Figure 2:
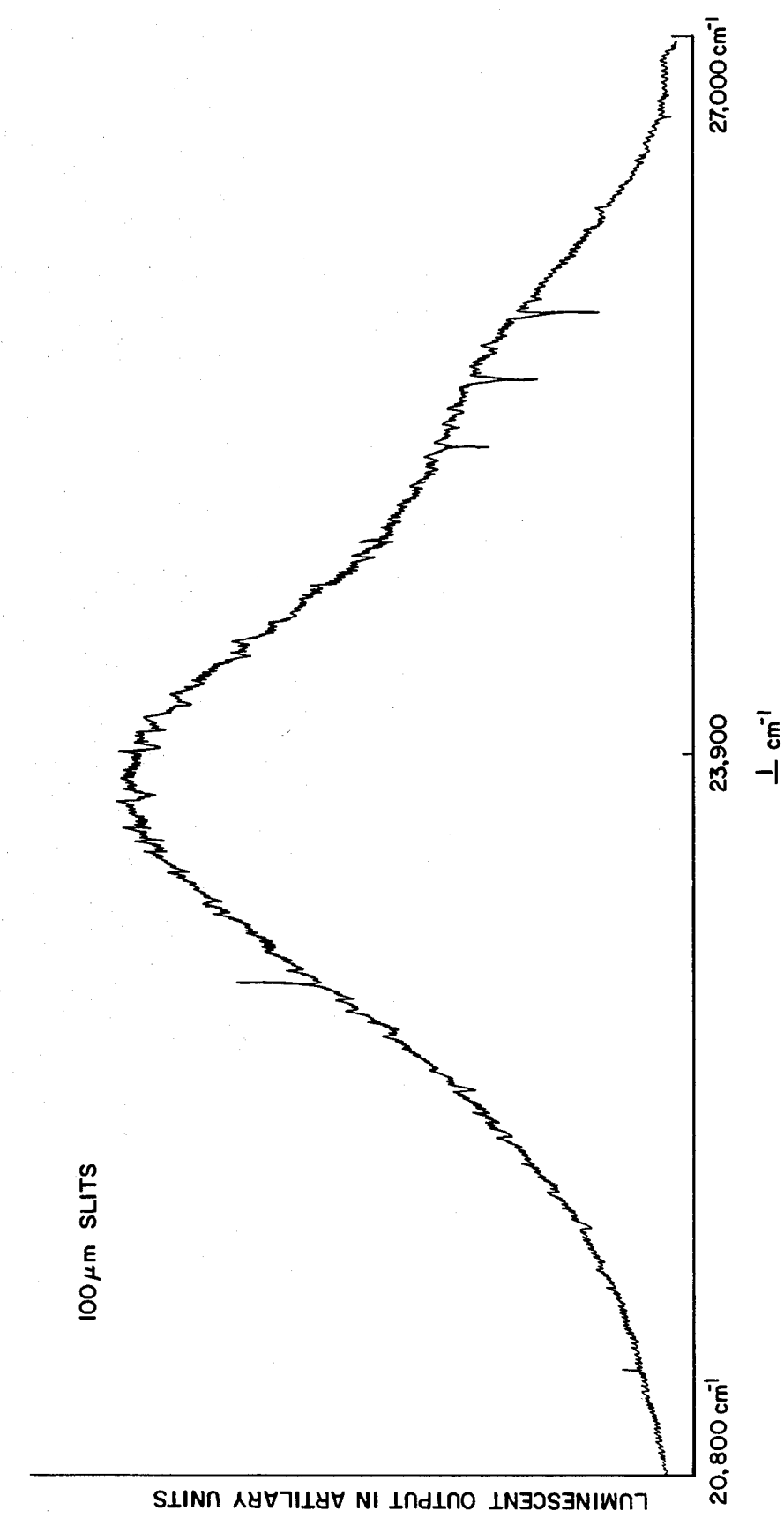

A sample of composition $3HfO_2+Y_2O_3$ (dry mixed powder) was fired 60 hrs in argon as in Example 1. No room temperature luminescence was observed after firing under 3650 Å. The powder was fired a second time in air at 1,000° C. for 2 hours. Again no room temperature luminescence was observed. To the powder was now added enough $Ce(NO_3)_3$ and LiCl solutions to get, after drying, the composition $3HfO_2:Y_2O_3:0.4\%Ce^{3+}:0.8\%Li^+$. After a 6 hr firing of this mixture at 1300° C. in argon a blue luminescent powder was obtained having the emission spectrum shown in FIG. 2.

We have found phosphors which emit blue photoluminescence and cathodeluminescence in the blue-green region of the spectrum (4700–4900 Å) that consist essentially of $HfO_2:Y_2O_3$ with $Ce^{3+}$ as a dopant in concentrations ranging from about 0.1–1.0 weight %, and most preferably, about $0.4\%Ce^{3+}$. The Ce ions have been verified as $Ce^{3+}$ by electron spin resonance techniques; $Ce^{4+}$ does not work in the visible spectrum.

While there have been shown and described what are at present considered the preferred embodiments of the invention, it will be apparent to those skilled in the art that various changes and modifications may be made herein without departing from the scope of the invention as defined by the appended claims.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A blue-luminescing material of $3HfO_2:Y_2O_3$ with a $Ce^{3+}$ dopant in an amount of 0.1 to 1.0 weight percent exhibiting a cubic crystalline structure.

2. A luminescent material as claimed in claim 1 where the concentration of $Ce^{3+}$ dopant is about 0.4 weight %.

3. A process for producing a cubic luminescent material of the formula $3HfO_2:Y_2O_3:Ce^{3+}$ wherein $Ce^{3+}$ dopant is present in an amount from 0.1 to 1.0 weight percent which comprises
forming a mixture of pure $HfO_2$ with substantially pure $Y_2O_3$ in a $HfO_2:Y_2O_3$ ratio of 3:1;
adding an aqueous solution of a cerium salt thereto;
evaporating the resultant paste to a dry powder;
placing the resultant powder in a container made from a member of the group consisting of Vitreosil, Alundum, graphite, and pyrolytic boron nitride;
heating the powder about 1300° C. under a neutral or slightly reducing atmosphere for a period of about 2 to about 100 hours;
cooling to room temperature, and
heating in an oxidizing atmosphere at about 1000° C. for about 1 to 10 hours.

4. A method as claimed in claim 3 where a mineralizer in an amount up to one weight percent is added with the cercium salt to the mix to effect a more uniform luminescent material.

5. The method of claim 4 wherein said oxidizing atmosphere is air and said heating in air is from 1 to 3 hours.

6. The method of claim 5 wherein said cerium salt is selected from the class consisting of cerium nitrate and the double nitrate of cerium and magnesium.

7. The method of claim 6 wherein said mineralizer is selected from the class consisting of $NaNO_3$, $LiNO_3$, $Mg(NO_3)_2$, and LiCl.

8. The method of claim 7 wherein said mineralizer is selected from the class consisting of $NaNO_3$ and LiCl.

9. The product produced by the method of claim 4.

10. A method as claimed in claim 3 where the mixture is fired to about 1300° C. while in a pyrolytic boron nitride boat, under an atmosphere of Ar, or a 99% $N_2$, 1% $H_2$ atmosphere.

11. The product produced by the method of claim 3.

* * * * *